United States Patent Office 3,763,128
Patented Oct. 2, 1973

3,763,128
NOVEL CO-INITIATOR SYSTEMS
Roger N. Lewis, Pinole, and Ronald L. Friedman, San Rafael, Calif., assignors to Argus Chemical Corporation, Brooklyn, N.Y.
No Drawing. Original application Apr. 8, 1970, Ser. No. 26,768, now Patent No. 3,687,867. Divided and this application Apr. 19, 1972, Ser. No. 245,285
Int. Cl. C08f 3/04, 3/30, 3/68
U.S. Cl. 260—89.1                1 Claim

ABSTRACT OF THE DISCLOSURE

The combination of tertiary alkyl peresters of tertiary hydroperoxides and either organic azo compounds containing the monovalent —CN radical or diacyl peroxides useful as polymerization initiators. These co-initiator systems are particularly efficient in the polymerization of certain vinyl monomers such as vinyl chloride.

---

This is a division of application, Ser. No. 26,768, filed Apr. 8, 1970, now U.S. Pat. No. 3,687,867.

This invention relates to organic peroxide-containing polymerization initiators. More particularly, it relates to the combination of t-alkyl peresters of t-hydroperoxides with nitrile-containing azo compounds or certain aliphatic diacyl compounds and to their use in the polymerization of monomers such as vinyl chloride.

U.S. Pat. 3,420,807 describes the polymerization of vinyl monomers through the use of a co-initiator composition of certain tertiary alkyl peresters and the "usual" diacyl peroxides such as lauroyl peroxide. The present invention is directed to an improved co-initiator system useful for bulk, solution and suspension polymerization and copolymerization of all the common vinyl monomers including styrene, ethylene, vinyl chloride, vinyl acetate, vinylidene chloride, methyl methacrylate, methyl acrylate and the like. It has been found that the co-initiator systems of this invention provide yields of polymer product, under comparable conditions of time and temperature, that are substantially higher than with corresponding quantities of prior art co-initiators.

In accordance with the present invention the new co-initiator systems are selected from certain peresters in combination with certain aliphatic diacyl peroxides or nitrile-containing azo compounds.

PERESTERS

Peresters found to be suitable for this invention have the general formula:

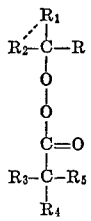

wherein $R_1$ and $R_2$ are alkyl, phenyl, or participate in a cycloalkyl group where shown in broken lines, $R_3$, $R_4$, and $R_5$ are alkyl, and R is selected from the group consisting of alkyl, alkynyl, phenyl, cyclohexyl, and

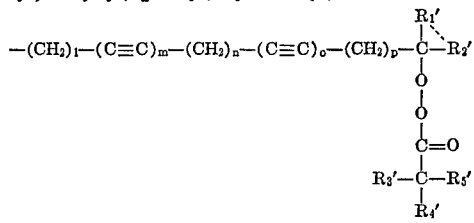

in which $l$, $m$, $n$, $o$, and $p$ are integers from 0–5 provided the sum of $l$, $m$, $n$, $o$, and $p$ is at least 1, and $R_1'$, $R_2'$, $R_3'$, $R_4'$, and $R_5'$ are each the same as $R_1$, $R_2$, $R_3$, $R_4$, and $R_5$ respectively. Particularly desirable results are obtained when the co-initiator is a diacyl peroxide, and more than one of $R_3$, $R_4$ and $R_5$ of the perester contains 2 or more carbon atoms, as hereinafter defined.

A preferred group of peresters is obtained where R is an alkyl, cyclohexyl, phenyl, or alkynyl group so that a monoperester is provided. A typical example within this category is the case where R, $R_1$ and $R_2$ are all methyl groups. Such peresters are derived by the esterification of tertiary butyl hydroperoxide in accordance with the following general reaction:

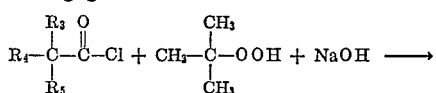

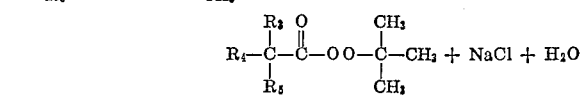

The same reaction is involved where R is an alkynyl, phenyl, or cyclohexyl group. Such a perester would be obtained for example where the following hydroperoxide is used instead of the tertiary butyl hydroperoxide shown:

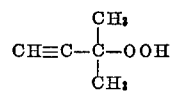

Equally useful hydroperoxides include:
(1) 1-cyclohexyl-1-hydroperoxy ethyne-1
(2) 3-methyl-3-hydroperoxy butyne-1
(3) 3-methyl-3-hydroperoxy pentyne-1
(4) 3,5-dimethyl-3-hydroperoxy hexyne-1
(5) 3-phenyl-3-hydroperoxy butyne-1
(6) 3-phenyl-3-hydroperoxy propyne-1
(7) 5-methyl-3-ethyl-3-hydroperoxy heptyne-1
(8) 3-methyl-3-hydroperoxy decyne-1
(9) 3,6-dimethyl-3-hydroperoxy-heptyne-1
(10) 3,5-dimethyl-3-hydroperoxy hexyne-1
(11) 3,4-dimethyl-3-hydroperoxy pentyne-1
(12) 3-methyl-3-hydroperoxy nonyne-1

All of the above may be used as saturated hydroperoxides if the acetylenic site is hydrogenated in the usual fashion. The foregoing examples are typical of the possible cyclohexyl groups which may occur at R as well as $R_1$ and $R_2$. In general, any alkyl, alkynyl, phenyl, or cyclohexyl group desired is contemplated for R, $R_1$, $R_2$ in which any rings present may contain alkyl substituents. In addition, all of these groups may contain other non-interfering substituents such as halogen atoms as desired. For practical purposes the reactants will generally be selected so that the total perester molecule obtained contains not more than about 50 carbon atoms so that the active oxygen content of the composition will not be too low for commercial purposes.

Instead of a monohydroperoxide, dihydroperoxides are contemplated whereby a diperester is obtained as the end product. In this case R in the above general formula is the group:

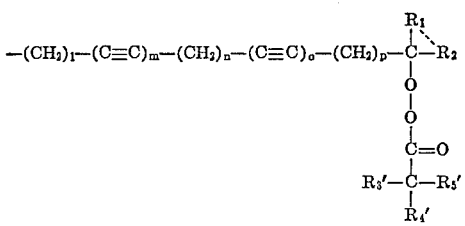

Typical dihydroperoxides which can be used are:

(1) 2,5-dimethyl-2,5-dihydroperoxy hexyne-3
(2) 2,7-dimethyl-2,7-dihydroperoxy octyne-4
(3) 3,4,7,8-tetramethyl-4,7-dihydroperoxy decyne-5
(4) 4,7-dimethyl-4,7-dihydroperoxy decyne-5
(5) 3,6-diethyl-3,6-dihydroperoxy octyne-4
(6) 3,4-dimethyl-3,4-dihydroperoxy pentyne-1

Where a dihydroperoxide is used as a starting reactant in the esterification reaction given previously, twice the amount of acid halide is used for esterifying the two available sites. A preferred saturated dihydroperoxide for use in this invention is 2,5-dimethyl-2,5-dihydroperoxyhexane. Additional saturated dihydroperoxides useful in this esterification reaction for preparing the present compounds are described in the preparation of disperesters in U.S. Pat. 3,264,274.

Additional useful acetylenically unsaturated dihydroperoxides useful in preparing the present peresters are more fully described in connection with the peresters of co-pending patent application, Ser. No. 531,352 filed Mar. 3, 1966, and now abandoned. A number of patents describe the use of dihydroperoxides having more than one acetylenic site. The preparation of the foregoing peresters is described in co-pending patent application, Ser. No. 725,931, filed May 1, 1968, and now Pat. No. 3,624,123.

NITRILE-CONTAINING AZO COMPOUNDS

Intended to be included in this group of co-initiators with the peresters are organic azo compounds containing a monovalent —CN radical. More particularly, those aliphatic compounds found to be useful include nitrile-containing azo free radical generators having the formula

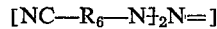

$$[NC-R_6-N=\!\!=\!\!_2N=\!\!=]$$

wherein $R_6$ is a branched or straight chain hydrocarbon radical of up to 20 carbons and preferably up to 10 carbons. It is contemplated that R will include non-interfering substituents. The preparation of such suitable compounds is disclosed in U.S. Pat. 2,471,959 and includes $\alpha,\alpha'$-azobisisobutyronitrile and $\alpha,\alpha'$-azobis-2,4-dimethyl valeronitrile.

DIACYL PEROXIDES

Broadly, useful diacyl peroxides, well known to those skilled in this art, are defined by the following structural formula:

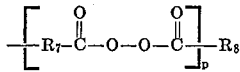

wherein $p$ is an integer of from 1 to 2, $R_7$ and $R_8$ are aliphatic hydrocarbons of about 7 to 13 carbon atoms, either straight chain or branched, with the proviso that when R, $R_1$ and $R_2$ are methyl and two or more of $R_3$, $R_4$ and $R_5$ are methyl $R_7$ and $R_8$ are hydrocarbons of 7–9 carbon atoms. Although it is desirable that $R_7$ and $R_8$ be unsubstituted, non-hydrocarbon substituents may be included provided they produce no undesirable side effects. Preferred examples of diacyl compounds to be utilized in the co-catalyst system of this invention include lauroyl peroxide, 3,5,5-trimethylhexanoyl peroxide, pelargonoyl peroxide, myristoyl peroxide and the like. The preparation of the various diacyl peroxides included herein as co-initiators is well known to those skilled in this art.

Catalyst concentrations, ratios and reaction temperatures can be varied widely, as they are dictated primarily by commercial equipment limitations such as heat exchange capacity or economics. Preferably each component in the co-initiator is present in a similar amount of from 0.01% to 0.50%. Reaction temperatures will vary from 35–70° C. with 50–65° C. being conventional for most commercial systems.

To further illustrate the process of this invention, the following examples are provided. It should be understood that the details thereof are not to be regarded as limitations as they may be varied as will be understood by one skilled in this art.

Example I

The co-initiators of this invention are most advantageously used for the polymerization of styrene, vinyl chloride, vinyl acetate, and ethylene. Typical of the beneficial results obtained are illustrated by the polymerization of vinyl chloride. The peroxides listed in Table I below were prepared by the methods described in co-pending application, Ser. No. 725,931, supra, while the diacyl peroxides and the nitrile-containing compounds were commercially available.

The polymerization procedure used is as follows: Into a 6½ fluid ounce Coke bottle, containing 94.0 g. of frozen dispersing solution, were added the appropriate amount of peroxide and 50.0 g. of vinyl chloride monomer. The Coke bottle was capped, the contents almost melted, and then the bottle is placed in a rotating constant temperature bath at 50±1° C. After the bottle was cooled, and the excess monomer vented, the PVC was filtered, washed, and dried at 40–50° C. for 12–16 hours. The percent yield of polyvinyl chloride polymer was monitored with respect to time. The results are shown in Table I.

TABLE I
Coke bottle polymerizations at 50° C. + 1° C. using vinyl chloride monomer

| | Catalyst | Conc., percent | Percent PVC conversion | | | | | |
|---|---|---|---|---|---|---|---|---|
| | | | 2 hrs. | 4 hrs. | 6 hrs. | 8 hrs. | 10 hrs. | 12 hrs. |
| 1 | Lauroyl peroxide | 0.50 | 7 | 21 | 38 | 59 | 86 | 93 |
| 2 | t-Butyl perpivalate | 0.05 | 6 | 16 | 28 | 43 | 60 | 76 |
| 3 | t-Butyl perneodecanoate | 0.053 | 13 | 31 | 55 | 74 | 83 | 86 |
| 4 | $\alpha,\alpha'$-azobis-2,4-dimethyl valeronitrile | 0.05 | 10 | 24 | 40 | 58 | 75 | 88 |
| 5 | {t-Butyl perpivalate / Lauroyl peroxide} | 0.03 / 0.15 | 5 | 14 | 27 | 41 | 54 | 71 |
| 6 | {t-Butyl perneodecanoate / Lauroyl peroxide} | 0.03 / 0.15 | 10 | 24 | 40 | 54 | 67 | 79 |
| 7 | {t-Butyl perneodecanoate / Lauroyl peroxide} | 0.025 / 0.20 | 10 | 24 | 37 | 52 | 67 | 80 |
| 8 | {t-Butyl perneodecanoate / Lauroyl peroxide} | 0.03 / 0.20 | 11 | 25 | 41 | 56 | 71 | 84 |
| 9 | {t-Butyl perneodecanoate / Pelargonoyl peroxide} | 0.03 / 0.15 | 10 | 25 | 46 | 60 | 80 | 92 |
| 10 | {t-Butyl perneodecanoate / Methylhexanoyl peroxide} | 0.03 / 0.15 | 10 | 30 | 48 | 69 | 85 | 91 |
| 11 | {t-Butyl perneodecanoate / $\alpha,\alpha'$-Azobis-2,4-dimethyl valeronitrile} | 0.025 / 0.025 | 12 | 27 | 43 | 57 | 69 | 79 |

It will be seen from Table I that a corresponding quantity of vinyl chloride monomer conversion is accomplished with 0.50% lauroyl peroxide and as little as 0.03% t-butyl perneodecanoate and 0.20% lauroyl peroxide. Furthermore, the prior art co-catalyst system composed of t-butyl perpivalate and lauroyl peroxide, in similar quantities, produces significantly less conversion.

Example II

A further polymerization was conducted in a one liter, stainless steel autoclave using the following procedure: The autoclave was charged with a 525 gram suspension solution. The autoclave was sealed and the agitator turned on. Next, 175 grams of vinyl chloride monomer were injected into the autoclave using nitrogen pressure. The temperature was raised to 57° C. Thereafter, a catalyst solution (containing 0.025% t-butyl perneodecanoate and 0.125% lauroyl peroxide) was prepared and injected into the autoclave using nitrogen pressure. After eight hours at 57° C. a sufficient pressure decrease occurred in the autoclave, indicating high conversion of the monomer to polymer. The autoclave was vented and the polyvinyl chloride washed and dried to a constant weight. The percent polyvinyl chloride conversion was found to be 90%.

Although the foregoing invention has been described in some detail by way of illustration and example for purposes of clarity of understanding, it is understood that certain changes and modifications may be practiced within the spirit of the invention as limited only by the scope of the appended claim.

What is claimed is:

1. In the polymerization of a monomer mass containing a monomer selected from the group consisting of styrene, vinyl chloride, vinyl acetate, vinylidene chloride, methyl methacrylate, methyl acrylate, and ethylene, the improvement comprising initiating the polymerization of said monomer mass with a catalytic amount of an organic peroxide co-initiator consisting essentially of similar amounts of a perester of the formula:

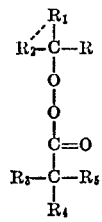

wherein $R_1$ and $R_2$ are alkyl, phenyl, or participate in a cycloalkyl group where shown in broken lines, $R_3$, $R_4$, and $R_5$ are alkyl and more than one contains 2 or more carbon atoms, and R is selected from the group consisting of alkyl, alkynyl, phenyl, cyclohexyl, and

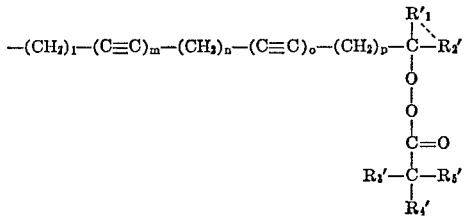

in which $l$, $m$, $n$, $o$, and $p$ are integers from 0–5 provided the sum of $l$, $m$, $n$, $o$, and $p$ is at least 1, and $R_1'$, $R_2'$, $R_3'$, $R_4'$, and $R_5'$ are each the same as $R_1$, $R_2$, $R_3$, $R_4$, and $R_5$ respectively; and an aliphatic diacyl peroxide of the formula

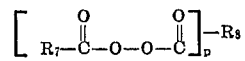

wherein $R_7$ and $R_8$ are hydrocarbon radicals of 7–13 carbons and $p$ is an integer of 1 to 2, with the proviso that when R, $R_1$ and $R_2$ are methyl and 2 or more of $R_3$, $R_4$ and $R_5$ are methyl, $R_7$ and $R_8$ are hydrocarbon radicals containing 7–9 carbon atoms.

References Cited
UNITED STATES PATENTS
3,446,831   5/1969   Mageli et al. _____ 260—85.5 F HARRY WONG, JR., Primary Examiner U.S. Cl. X.R.

252—426; 260—89.5 A, 91.7, 92.8 R, 93.5 S, 94.9 R, DIG. 28